Figure 1:
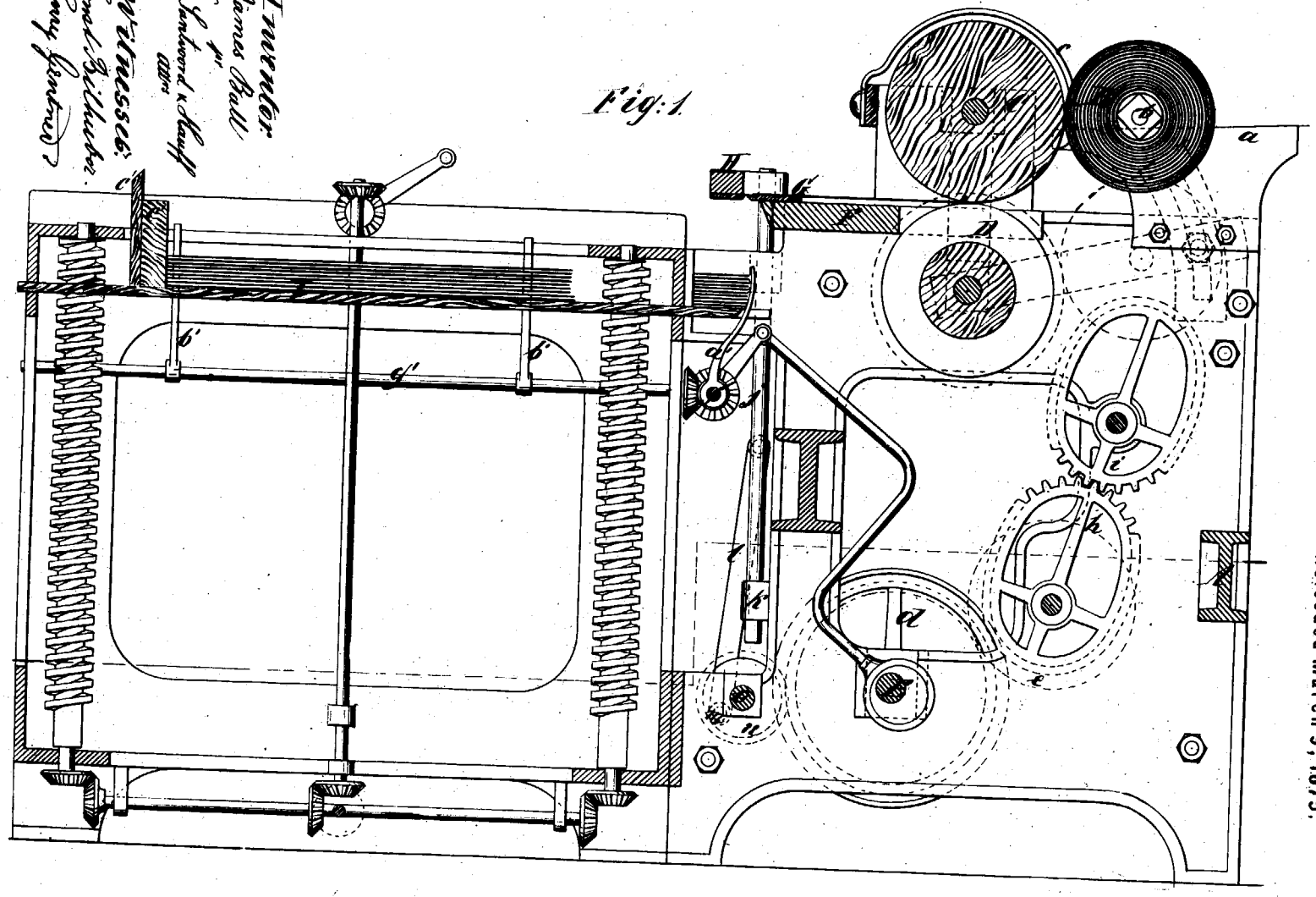

3 Sheets--Sheet 1.

J. BALL.

Machine for Cutting Paper or other Materials.

No. 6,324. Reissued March 9, 1875.

Inventor:
James Ball
per
Van Santwood & Hauff
Attys

Witnesses:
Ernst Bilhuber.
Henry Gentner

3 Sheets--Sheet 2.
J. BALL.
Machine for Cutting Paper or other Materials.
No. 6,324. Reissued March 9, 1875.
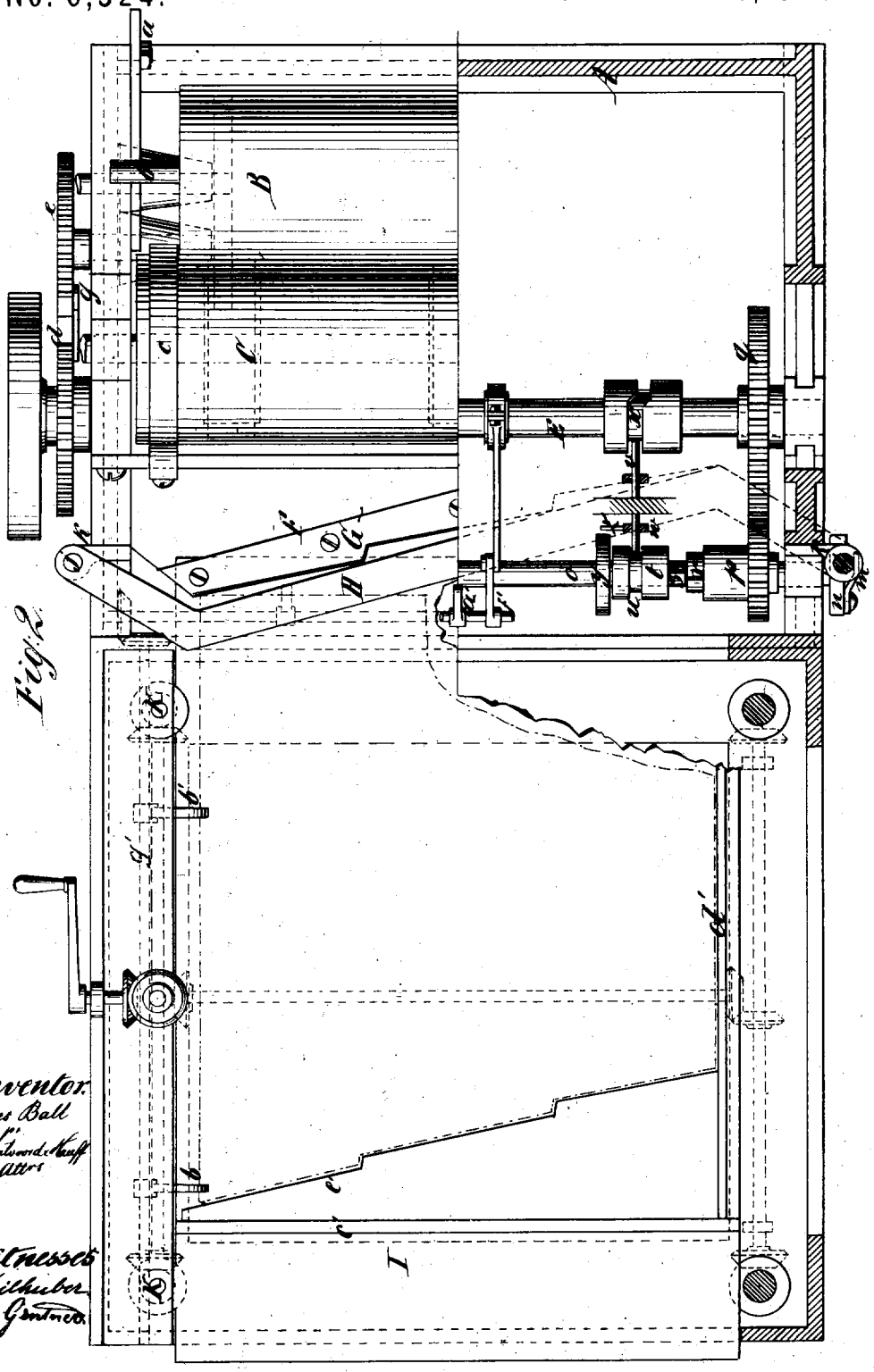

J. BALL.
Machine for Cutting Paper or other Materials.
No. 6,324. Reissued March 9, 1875.
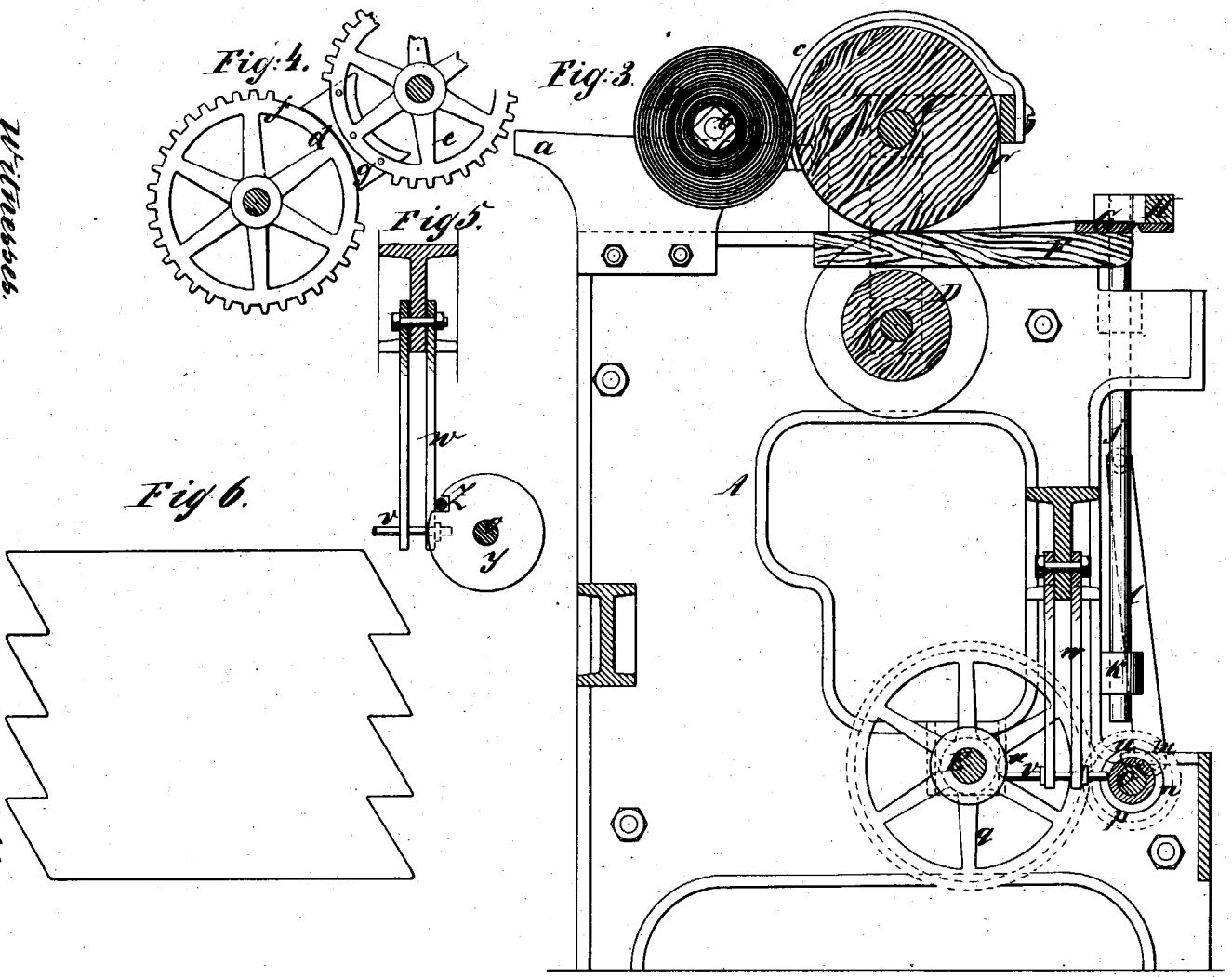
Witnesses.
Ernst Bilhuber.
Henry Gentner
Inventor.
James Ball
per
Van Santvoord & Hauff
Attys

BEST AVAILABLE COPY

UNITED STATES PATENT OFFICE.

JAMES BALL, OF BROOKLYN, NEW YORK, ASSIGNOR TO SAMUEL RAYNOR & CO., AND JOHN Q. PREBLE.

IMPROVEMENT IN MACHINES FOR CUTTING PAPER OR OTHER MATERIALS.

Specification forming part of Letters Patent No. 111,420, dated January 31, 1871; reissue No. 6,324, dated March 9, 1875; application filed November 19, 1874.

*To all whom it may concern:*

Be it known that I, JAMES BALL, of Brooklyn, in the county of Kings and State of New York, have invented a certain new and Improved Machine for Cutting Paper or other material, of which the following is a specification:

This invention is illustrated in the accompanying drawing, in which—

Figure 1 represents a longitudinal vertical section. Fig. 2 is a plan or top view. Fig. 3 is a vertical section of the cutting mechanism, showing the opposite side from that shown in Fig. 1. Figs. 4, 5, and 6 are details referred to in the following description.

Similar letters indicate corresponding parts.

This invention relates to a machine intended particularly for cutting, from a roll of paper or other material, sheets such as described in my Patent No. 106,451, dated August 16, 1870, or sheets of a similar nature, from which the blanks for envelopes or other articles can be cut with great economy in stock.

The roll of paper or other material is placed loosely on guides, so that it can adjust itself laterally, and that the material drawn off from said roll will pass regularly between guides of the feed-cylinder without regard to the regularity or irregularity of the roll itself. The motion of the feed-cylinder is intermittent, said cylinder being held stationary and retained in position by a segmental stop during the time the knife is in action. The motion of the feed-cylinder is further governed by elliptic gear-wheels, so that it starts slowly, then its velocity is increased, and, finally, again decreased toward the close of its motion, and, consequently, the material is drawn off from the roll slowly at first, to prevent the material from being torn, then quicker and quicker, until the sheet is drawn out about half-way, when the velocity again gradually decreases, to prevent the roll from turning any farther than desirable by its own momentum. The motion of the knife alternates with that of the feed-cylinder, said knife being stationary while the feed-cylinder moves, and vice versa, the motion of the knife being governed by a clutch, which is automatically thrown in and out of gear at the proper intervals by a cam. The knife extends across the entire width of the sheet, and its cutting-edge is scalloped or recessed to produce sheets with corresponding scallops or recesses in their ends, from which blanks for envelopes or other articles can be cut with great economy. The sheets, after having been cut off from the roll, drop on a platform provided with guide-strips and with beaters, whereby said sheets are adjusted automatically in a uniform pile. The platform rests on four worm-screws, and by turning these screws said platform is gradually lowered as the pile of sheets supported by it increases, so that the same, on reaching the bottom of the screws, can be conveniently removed, while a new platform is placed on the top of the screws, and the operation of cutting can be continued without interruption.

In the drawing, the letter A designates a frame, on the top of which are formed two rectilinear guides, *a*, which form the supports for the gudgeons *b* of the roll, B, of paper or other articles. The material drawn from the roll passes under the feed-cylinder C, which bears on the peripheries of a series of rollers, D, so that by imparting to said rollers and to the feed-cylinder a revolving motion, the paper or other material is drawn off from the roll. Two segmental guides, *c*, which extend over the feed-cylinder serve to keep the paper or other material which has been drawn off from the roll in the proper direction, and the roll B is placed loosely on the guides *a*, so that it is free to adjust itself laterally—a precaution which is necessary, because the rolls of material are not wound perfectly regular, as an inspection of their ends will show. The feed-cylinder C and the rollers D are geared together, so that they revolve in opposite directions, and they are connected with the driving-shaft E by a train of gear-wheels, as indicated partly in full and partly in dotted lines in Fig. 1.

On the driving-shaft is mounted a cog-wheel, *d*, which has a portion of its teeth cut away, and which gears in an intermediate gear-wheel, *e*. On the side of the cog-wheel *d*, alongside of that portion thereof which has no teeth, is secured a plain segment, *f*, corresponding to a concave segmental stop secured to the side of the gear-wheel *e*, (see Fig. 4,) so that the last-named gear-wheel is prevented from turning during the time the plain part of the cog-wheel *d* sweeps past the same, and thereby the whole train of wheels, which depend upon the gear-wheel *e* for their motion, and also the feed-cylinder, remain stationary during a certain part of the revolution of the driving-shaft—that is to say, during the time the knife is in motion. From the gear-wheel *e* the motion is transmitted to the feed-cylinder by means of two elliptic gear-wheels, *h i*, (see Fig. 1,) which are so adjusted in relation to each other that the feed-cylinder on being started begins to move quite slowly; then its speed is gradually increased, and finally again decreased, so that it comes gradually to a stop. The object of this arrangement is to draw the paper or other material gradually from the roll, since said material would be liable to be torn if the feed-cylinder should be started suddenly; and if said cylinder should stop suddenly the roll of paper would be liable to revolve by its own momentum farther than required, whereby the paper would be wrinkled, and the correct operation of the apparatus would be disturbed.

The paper or other material, on being drawn off from the roll, is carried out over the platform F, on the end of which is secured a stationary cutting-blade, G, which, in connection with the reciprocating knife H, effects the cutting of the paper, the motion of the feed-cylinder being so adjusted that for each stroke of the knife the required quantity of paper or material is drawn out from the roll.

The cutting-edges of the knife and of the cutting-blade extend across the entire width of the material, and they are scalloped or recessed to correspond to each other, and to produce sheets such as shown in Fig. 6. The great advantage gained by cutting the sheets in this form is apparent from the fact that if the sheets are cut with square or rectilinear edges it requires, under the best possible management, thirty inches in length—the width of the sheet being that of the roll from which the sheets are cut, about twenty-five inches—for sixteen envelope-blanks of ordinary letter size; but by cutting the sheets with pectinated or scalloped edges, according to my invention, only twenty-seven inches in length are required for sixteen envelopes of the same size, and consequently a saving of ten per cent. of material is effected.

If it is considered that in the manufactory where I am employed we have cut up as much as forty-five thousand yards of paper per day, and that by my machine a saving of four thousand five hundred yards of paper per day is effected, the advantage of my invention will be apparent; and if my machine is used for cutting out blanks for paper collars or similar articles, a corresponding saving will be effected.

The knife H is secured at its ends to vertical bars *j*, which move up and down in guides *k*, motion being imparted to them by pitman-rods *l*, which extend from said bars to eccentric wrist-pins *m*, secured in disks *n*, which are mounted on the ends of a shaft, *o*. This shaft is geared together with the driving-shaft E by a pinion, *p*, and cog-wheel, *q*, (see Fig. 2,) but the pinion *p* is mounted loosely on the shaft *o*, and it is provided in the end of its hub with a tooth or pin, *r*, (see Fig. 2,) which can be made to engage with a similar tooth or pin, *s*, projecting from the end of a sleeve, *t*, which is mounted on the shaft *o* by means of a feather-key, so that it can slide thereon, without, however, being allowed to revolve independent of said shaft.

This sleeve is provided with a groove, *u*, which engages with a pin, *v*, secured in a lever, *w*, which is pivoted to the main frame, said pin *v* being also made to engage with a cam-groove, *x*, formed in a drum, which is mounted on the driving-shaft. By this cam-groove the sleeve or clutch *t* is thrown in gear with the pinion *p* at the moment the feed-cylinder stops, and thereby the knife is set in motion, and as soon as the knife has completed its down-and-up stroke the clutch is again thrown out of gear with the pinion, and the motion of the knife stops.

In order to retain the knife securely in position after its motion stops, a disk, *y*, is mounted on the shaft *o*, and in the periphery of this disk is made a notch, which engages with a pin, *z*, Figs. 2 and 5, projecting from the lever *w*, just at the moment the clutch is thrown out of gear with the pinion. The sheets which are cut off from the roll drop down upon a platform, I, which is supported by the threads of four worm-screws, K, said screws being geared together, so that they can be turned simultaneously in the proper direction, to impart to the platform resting thereon a slow downward motion. With the platform I are combined two sets of beaters, *a′ b′*, which are situated opposite to gages *c′ d′*, rising from the platform, so that each sheet, after having been dropped upon the platform, will be pushed up against said gages, and the sheets will arrange themselves in a regular pile. The gages must, of course, conform to the irregular edges of the sheets, and they may be curved or bent to conform to said edges, or they may be provided with projecting blocks *e′*, which are fastened to them, and which can be removed and replaced by others, to correspond to blanks of a different shape. The beaters *a′ b′* are mounted on shafts *f′ g′*, which are geared together and receive an intermittent motion by a suitable connection with the driving-shaft E, as shown in Fig. 1.

The screws K may be operated by hand, or they may be geared together with the driving-shaft; and if a pile of sufficient height has accumulated on one platform another is introduced, and the operation of cutting is continued without interruption.

The platforms descend, and are discharged at the bottom ends of the screws K, and the piles resting thereon are then removed to the ordinary cutting-machine.

What I claim as new, and desire to secure by Letters Patent, is—

1. The guides *a*, supporting the gudgeons of the roll of paper or other material, and allowing said roll to adjust itself laterally in accordance with the guides *c* of the feed-cylinder, combined to operate substantially as described.

2. The wheel *d*, with plain segment *f*, segmental stop *g*, and wheel *e*, and the elliptic wheels *h i*, combined and operating together, in relation to the feed-cylinder, substantially as and for the purpose described.

3. The knife H, in combination with the rod *l*, disks *n*, loose pinion *h*, sleeve or clutch *t*, teeth *r s*, groove *u*, pin *v*, and cam-groove *x*, substantially as and for the purpose set forth.

4. The combination of the two knives G H, both being situated in horizontal planes, the knife G forming the continuation of the platform over which the material to be cut is fed, the cutting-edges of both knives being recessed to conform to the shape of the sheets to be cut, substantially as described.

5. The pin *z*, projecting from the lever *w*, and the notched disk *y*, operating together, in combination with the stop mechanism of the knife, substantially as and for the purpose described.

6. The platform I, having its edges bearing on the inner portions of the threads of the endless geared screws K, combined substantially as described, so that an empty platform may be substituted for the loaded platform.

7. The combination of the beaters *a′ b′* and gages *c′ d′* with the platform I, substantially as set forth.

In testimony that I claim the foregoing I have hereunto set my hand this 11th day of November, 1874.

JAMES BALL.

Witnesses:
W. HAUFF,
E. F. KASTENHUBER.